(12) United States Patent
Liu et al.

(10) Patent No.: US 11,573,095 B2
(45) Date of Patent: Feb. 7, 2023

(54) VERIFICATION MODULE SYSTEM AND METHOD FOR MOTION-BASED LANE DETECTION WITH MULTIPLE SENSORS

(71) Applicant: TUSIMPLE, INC., San Diego, CA (US)

(72) Inventors: Siyuan Liu, San Diego, CA (US);
Mingdong Wang, San Diego, CA (US);
Xiaodi Hou, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 292 days.

(21) Appl. No.: 17/074,468

(22) Filed: Oct. 19, 2020

(65) Prior Publication Data
US 2021/0033420 A1 Feb. 4, 2021

Related U.S. Application Data

(63) Continuation of application No. 15/683,441, filed on Aug. 22, 2017, now Pat. No. 10,816,354.

(51) Int. Cl.
*G01C 21/36* (2006.01)
*G06V 20/56* (2022.01)
(Continued)

(52) U.S. Cl.
CPC ....... *G01C 21/3658* (2013.01); *G06V 20/588* (2022.01); *G01S 17/86* (2020.01); *G01S 17/89* (2013.01); *G06V 2201/10* (2022.01)

(58) Field of Classification Search
CPC ............ G01C 21/3658; G06V 20/588; G06V 2201/10; G01S 17/86; G01S 17/89
See application file for complete search history.

(56) References Cited

U.S. PATENT DOCUMENTS 6,084,870 A 7/2000 Wooten et al.
6,263,088 B1 7/2001 Crabtree et al.
(Continued)

FOREIGN PATENT DOCUMENTS

CN 106340197 A 1/2017
CN 106781591 A 5/2017
(Continued)

OTHER PUBLICATIONS

Extended European Search Report for European Patent Application No. 18849237.5, dated Apr. 23, 2021.
(Continued)

*Primary Examiner* — Alan D Hutchinson
(74) *Attorney, Agent, or Firm* — Paul Liu; Glenn Theodore Mathews; Perkins Coie, LLP

(57) ABSTRACT

A method of lane detection for a non-transitory computer readable storage medium storing one or more programs is disclosed. The one or more programs include instructions, which when executed by a computing device, cause the computing device to perform the following steps comprising: generating a ground truth associated with lane markings expressed in god's view; receiving features from at least one of a hit-map image and a fitted lane marking, wherein the hit-map image includes a classification of pixels that hit a lane marking, and the fitted lane marking includes pixels optimized based on the hit-map image; and training a confidence module based on the features and the ground truth, the confidence module configured to determine on-line whether a fitted lane marking is reasonable, using parameters that express a lane marking in an arc.

20 Claims, 12 Drawing Sheets

(51) Int. Cl.
*G01S 17/89* (2020.01)
*G01S 17/86* (2020.01)

(56) References Cited

U.S. PATENT DOCUMENTS

| | | |
|---|---|---|
| 6,594,821 B1 | 7/2003 | Banning et al. |
| 6,777,904 B1 | 8/2004 | Degner et al. |
| 6,975,923 B2 | 12/2005 | Spriggs |
| 7,103,460 B1 | 9/2006 | Breed |
| 7,689,559 B2 | 3/2010 | Canright et al. |
| 7,742,841 B2 | 6/2010 | Sakai et al. |
| 7,783,403 B2 | 8/2010 | Breed |
| 7,844,595 B2 | 11/2010 | Canright et al. |
| 8,041,111 B1 | 10/2011 | Wilensky |
| 8,064,643 B2 | 11/2011 | Stein et al. |
| 8,082,101 B2 | 12/2011 | Stein et al. |
| 8,164,628 B2 | 4/2012 | Stein et al. |
| 8,175,376 B2 | 5/2012 | Marchesotti et al. |
| 8,271,871 B2 | 9/2012 | Marchesotti |
| 8,346,480 B2 | 1/2013 | Trepagnier et al. |
| 8,378,851 B2 | 2/2013 | Stein et al. |
| 8,392,117 B2 | 3/2013 | Dolgov et al. |
| 8,401,292 B2 | 3/2013 | Park et al. |
| 8,412,449 B2 | 4/2013 | Trepagnier et al. |
| 8,478,072 B2 | 7/2013 | Aisaka et al. |
| 8,553,088 B2 | 10/2013 | Stein et al. |
| 8,706,394 B2 | 4/2014 | Trepagnier et al. |
| 8,718,861 B1 | 5/2014 | Montemerlo et al. |
| 8,788,134 B1 | 7/2014 | Litkouhi et al. |
| 8,908,041 B2 | 12/2014 | Stein et al. |
| 8,917,169 B2 | 12/2014 | Schofield et al. |
| 8,963,913 B2 | 2/2015 | Baek |
| 8,965,621 B1 | 2/2015 | Urmson et al. |
| 8,981,966 B2 | 3/2015 | Stein et al. |
| 8,983,708 B2 | 3/2015 | Choe et al. |
| 8,993,951 B2 | 3/2015 | Schofield et al. |
| 9,002,632 B1 | 4/2015 | Emigh |
| 9,008,369 B2 | 4/2015 | Schofield et al. |
| 9,025,880 B2 | 5/2015 | Perazzi et al. |
| 9,042,648 B2 | 5/2015 | Wang et al. |
| 9,081,385 B1 | 7/2015 | Ferguson et al. |
| 9,088,744 B2 | 7/2015 | Grauer et al. |
| 9,111,444 B2 | 8/2015 | Kaganovich |
| 9,117,133 B2 | 8/2015 | Barnes et al. |
| 9,118,816 B2 | 8/2015 | Stein et al. |
| 9,120,485 B1 | 9/2015 | Dolgov |
| 9,122,954 B2 | 9/2015 | Srebnik et al. |
| 9,134,402 B2 | 9/2015 | Sebastian et al. |
| 9,145,116 B2 | 9/2015 | Clarke et al. |
| 9,147,255 B1 | 9/2015 | Zhang et al. |
| 9,156,473 B2 | 10/2015 | Clarke et al. |
| 9,176,006 B2 | 11/2015 | Stein |
| 9,179,072 B2 | 11/2015 | Stein et al. |
| 9,183,447 B1 | 11/2015 | Gdalyahu et al. |
| 9,185,360 B2 | 11/2015 | Stein et al. |
| 9,191,634 B2 | 11/2015 | Schofield et al. |
| 9,214,084 B2 | 12/2015 | Grauer et al. |
| 9,219,873 B2 | 12/2015 | Grauer et al. |
| 9,233,659 B2 | 1/2016 | Rosenbaum et al. |
| 9,233,688 B2 | 1/2016 | Clarke et al. |
| 9,248,832 B2 | 2/2016 | Huberman |
| 9,248,835 B2 | 2/2016 | Tanzmeister |
| 9,251,708 B2 | 2/2016 | Rosenbaum et al. |
| 9,277,132 B2 | 3/2016 | Berberian |
| 9,280,711 B2 | 3/2016 | Stein |
| 9,282,144 B2 | 3/2016 | Tebay et al. |
| 9,286,522 B2 | 3/2016 | Stein et al. |
| 9,297,641 B2 | 3/2016 | Stein |
| 9,299,004 B2 | 3/2016 | Lin et al. |
| 9,315,192 B1 | 4/2016 | Zhu et al. |
| 9,317,033 B2 | 4/2016 | Ibanez-Guzman et al. |
| 9,317,776 B1 | 4/2016 | Honda et al. |
| 9,330,334 B2 | 5/2016 | Lin et al. |
| 9,342,074 B2 | 5/2016 | Dolgov et al. |
| 9,347,779 B1 | 5/2016 | Lynch |
| 9,355,635 B2 | 5/2016 | Gao et al. |
| 9,365,214 B2 | 6/2016 | Ben Shalom et al. |
| 9,399,397 B2 | 7/2016 | Mizutani et al. |
| 9,418,549 B2 | 8/2016 | Kang et al. |
| 9,428,192 B2 | 8/2016 | Schofield et al. |
| 9,436,880 B2 | 9/2016 | Bos et al. |
| 9,438,878 B2 | 9/2016 | Niebla et al. |
| 9,443,163 B2 | 9/2016 | Springer |
| 9,446,765 B2 | 9/2016 | Ben Shalom et al. |
| 9,459,515 B2 | 10/2016 | Stein |
| 9,466,006 B2 | 10/2016 | Duan |
| 9,476,970 B1 | 10/2016 | Fairfield et al. |
| 9,483,839 B1 | 11/2016 | Kwon et al. |
| 9,490,064 B2 | 11/2016 | Hirosawa et al. |
| 9,494,935 B2 | 11/2016 | Okumura et al. |
| 9,507,346 B1 | 11/2016 | Levinson et al. |
| 9,513,634 B2 | 12/2016 | Pack et al. |
| 9,531,966 B2 | 12/2016 | Stein et al. |
| 9,535,423 B1 | 1/2017 | Debreczeni |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,552,657 B2 | 1/2017 | Ueno et al. |
| 9,555,803 B2 | 1/2017 | Pawlicki et al. |
| 9,568,915 B1 | 2/2017 | Berntorp et al. |
| 9,587,952 B1 | 3/2017 | Slusar |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,612,123 B1 | 4/2017 | Levinson et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,652,860 B1 | 5/2017 | Maali et al. |
| 9,669,827 B1 | 6/2017 | Ferguson et al. |
| 9,672,446 B1 | 6/2017 | Vallespi-Gonzalez |
| 9,690,290 B2 | 6/2017 | Prokhorov |
| 9,701,023 B2 | 7/2017 | Zhang et al. |
| 9,712,754 B2 | 7/2017 | Grauer et al. |
| 9,720,418 B2 | 8/2017 | Stenneth |
| 9,723,097 B2 | 8/2017 | Harris et al. |
| 9,723,099 B2 | 8/2017 | Chen et al. |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,738,280 B2 | 8/2017 | Rayes |
| 9,739,609 B1 | 8/2017 | Lewis |
| 9,746,550 B2 | 8/2017 | Nath et al. |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 9,842,399 B2 | 12/2017 | Yamaguchi |
| 9,953,236 B1 | 4/2018 | Huang et al. |
| 10,147,193 B2 | 12/2018 | Huang et al. |
| 10,223,806 B1 | 3/2019 | Luo et al. |
| 10,223,807 B1 | 3/2019 | Luo et al. |
| 10,410,055 B2 | 9/2019 | Wang et al. |
| 10,816,354 B2 | 10/2020 | Liu |
| 2001/0051845 A1 | 12/2001 | Itoh |
| 2003/0114980 A1 | 6/2003 | Klausner et al. |
| 2003/0174773 A1 | 9/2003 | Comaniciu et al. |
| 2004/0264763 A1 | 12/2004 | Mas |
| 2007/0088497 A1 | 4/2007 | Jung |
| 2007/0183661 A1 | 8/2007 | El-Maleh et al. |
| 2007/0183662 A1 | 8/2007 | Wang et al. |
| 2007/0230792 A1 | 10/2007 | Shashua et al. |
| 2007/0286526 A1 | 12/2007 | Abousleman et al. |
| 2008/0109118 A1 | 5/2008 | Schwartz et al. |
| 2008/0249667 A1 | 10/2008 | Horvitz et al. |

(56) References Cited

U.S. PATENT DOCUMENTS

| | | |
|---|---|---|
| 2009/0040054 A1 | 2/2009 | Wang et al. |
| 2009/0087029 A1 | 4/2009 | Coleman et al. |
| 2010/0049397 A1 | 2/2010 | Liu et al. |
| 2010/0082238 A1 | 4/2010 | Nakamura et al. |
| 2010/0111417 A1 | 5/2010 | Ward et al. |
| 2010/0226564 A1 | 9/2010 | Marchesotti et al. |
| 2010/0281361 A1 | 11/2010 | Marchesotti |
| 2011/0142283 A1 | 6/2011 | Huang et al. |
| 2011/0206282 A1 | 8/2011 | Aisaka et al. |
| 2011/0247031 A1 | 10/2011 | Jacoby |
| 2012/0041636 A1 | 2/2012 | Johnson et al. |
| 2012/0105639 A1 | 5/2012 | Stein et al. |
| 2012/0140076 A1 | 6/2012 | Rosenbaum et al. |
| 2012/0274629 A1 | 11/2012 | Baek |
| 2012/0314070 A1 | 12/2012 | Zhang et al. |
| 2013/0051613 A1 | 2/2013 | Bobbitt et al. |
| 2013/0083959 A1 | 4/2013 | Owechko et al. |
| 2013/0182134 A1 | 7/2013 | Grundmann et al. |
| 2013/0204465 A1 | 8/2013 | Phillips et al. |
| 2013/0266187 A1 | 10/2013 | Bulan et al. |
| 2013/0329052 A1 | 12/2013 | Chew |
| 2014/0063489 A1 | 3/2014 | Steffey et al. |
| 2014/0072170 A1 | 3/2014 | Zhang et al. |
| 2014/0104051 A1 | 4/2014 | Breed |
| 2014/0142799 A1 | 5/2014 | Ferguson et al. |
| 2014/0143839 A1 | 5/2014 | Ricci |
| 2014/0145516 A1 | 5/2014 | Hirosawa et al. |
| 2014/0198184 A1 | 7/2014 | Stein et al. |
| 2014/0321704 A1 | 10/2014 | Partis |
| 2014/0334668 A1 | 11/2014 | Saund |
| 2015/0062304 A1 | 3/2015 | Stein et al. |
| 2015/0127239 A1 | 5/2015 | Breed et al. |
| 2015/0253428 A1 | 9/2015 | Holz |
| 2015/0269437 A1 | 9/2015 | Maruyama et al. |
| 2015/0269438 A1 | 9/2015 | Samarasekera |
| 2015/0292891 A1 | 10/2015 | Kojo |
| 2015/0310370 A1 | 10/2015 | Burry et al. |
| 2015/0353082 A1 | 12/2015 | Lee et al. |
| 2016/0008988 A1 | 1/2016 | Kennedy |
| 2016/0026787 A1 | 1/2016 | Nairn et al. |
| 2016/0037064 A1 | 2/2016 | Stein et al. |
| 2016/0046290 A1 | 2/2016 | Aharony et al. |
| 2016/0094774 A1 | 3/2016 | Li et al. |
| 2016/0118080 A1 | 4/2016 | Chen |
| 2016/0125608 A1 | 5/2016 | Sorstedt |
| 2016/0129907 A1 | 5/2016 | Kim et al. |
| 2016/0165157 A1 | 6/2016 | Stein et al. |
| 2016/0191860 A1 | 6/2016 | Jung |
| 2016/0210528 A1 | 7/2016 | Duan |
| 2016/0275766 A1 | 9/2016 | Venetianer et al. |
| 2016/0321381 A1 | 11/2016 | English et al. |
| 2016/0334230 A1 | 11/2016 | Ross et al. |
| 2016/0342837 A1 | 11/2016 | Hong et al. |
| 2016/0347322 A1 | 12/2016 | Clarke et al. |
| 2016/0375907 A1 | 12/2016 | Erban |
| 2017/0053169 A1 | 2/2017 | Cuban et al. |
| 2017/0061632 A1 | 3/2017 | Lindner |
| 2017/0124476 A1 | 5/2017 | Levinson et al. |
| 2017/0134631 A1 | 5/2017 | Zhao et al. |
| 2017/0177951 A1 | 6/2017 | Yang et al. |
| 2017/0227647 A1 | 8/2017 | Baik |
| 2017/0301104 A1 | 10/2017 | Qian et al. |
| 2017/0305423 A1 | 10/2017 | Green |
| 2017/0318407 A1 | 11/2017 | Meister |
| 2018/0005407 A1 | 1/2018 | Browning et al. |
| 2018/0111274 A1 | 4/2018 | Seok et al. |
| 2018/0131924 A1 | 5/2018 | Jung et al. |
| 2018/0149739 A1 | 5/2018 | Becker et al. |
| 2018/0151063 A1 | 5/2018 | Pun et al. |
| 2018/0158197 A1 | 6/2018 | Dasgupta et al. |
| 2018/0188043 A1 | 7/2018 | Chen et al. |
| 2018/0216943 A1 | 8/2018 | Hawkins et al. |
| 2018/0260956 A1 | 9/2018 | Huang et al. |
| 2018/0283892 A1 | 10/2018 | Behrendt |
| 2018/0284278 A1 | 10/2018 | Russell et al. |
| 2018/0315201 A1 | 11/2018 | Cameron et al. |
| 2018/0364717 A1 | 12/2018 | Douillard et al. |
| 2018/0373254 A1 | 12/2018 | Song et al. |
| 2018/0373980 A1 | 12/2018 | Huval |
| 2019/0025853 A1 | 1/2019 | Julian |
| 2019/0063945 A1 | 2/2019 | Liu |
| 2019/0065863 A1 | 2/2019 | Luo et al. |
| 2019/0066329 A1 | 2/2019 | Luo et al. |
| 2019/0066330 A1 | 2/2019 | Luo et al. |
| 2019/0108384 A1 | 4/2019 | Wang et al. |
| 2019/0132391 A1 | 5/2019 | Thomas et al. |
| 2019/0132392 A1 | 5/2019 | Liu et al. |
| 2019/0210564 A1 | 7/2019 | Han et al. |
| 2019/0210613 A1 | 7/2019 | Sun et al. |
| 2019/0226851 A1 | 7/2019 | Nicosevici et al. |
| 2019/0236950 A1 | 8/2019 | Li et al. |
| 2019/0266420 A1 | 8/2019 | Ge et al. |
| 2019/0339084 A1 | 11/2019 | Korenaga et al. |

FOREIGN PATENT DOCUMENTS

| | | |
|---|---|---|
| CN | 107111742 A | 8/2017 |
| CN | 108010360 A | 5/2018 |
| DE | 2608513 A1 | 9/1977 |
| EP | 890470 | 1/1999 |
| EP | 0890470 A2 | 1/1999 |
| EP | 1754179 A1 | 2/2007 |
| EP | 2448251 A2 | 5/2012 |
| EP | 2463843 A2 | 6/2012 |
| EP | 2761249 A1 | 8/2014 |
| EP | 2918974 A1 | 9/2015 |
| EP | 2946336 A2 | 11/2015 |
| EP | 2993654 A1 | 3/2016 |
| EP | 3081419 A1 | 10/2016 |
| JP | 2017198566 A | 11/2017 |
| KR | 100802511 B1 | 2/2008 |
| KR | 20170065083 A | 6/2017 |
| WO | 1991009375 | 6/1991 |
| WO | 1991009375 A1 | 6/1991 |
| WO | 2005098739 A1 | 10/2005 |
| WO | 2005098751 A1 | 10/2005 |
| WO | 2005098782 A1 | 10/2005 |
| WO | 2010109419 A1 | 9/2010 |
| WO | 2013045612 A1 | 4/2013 |
| WO | 2014111814 A2 | 7/2014 |
| WO | 2014166245 A1 | 10/2014 |
| WO | 2014201324 A1 | 12/2014 |
| WO | 2015083009 A1 | 6/2015 |
| WO | 2015103159 A1 | 7/2015 |
| WO | 2015125022 A2 | 8/2015 |
| WO | 2015186002 A2 | 12/2015 |
| WO | 2016090282 A1 | 6/2016 |
| WO | 2016135736 A2 | 9/2016 |
| WO | 2017013875 A1 | 1/2017 |
| WO | 2017079349 A1 | 5/2017 |
| WO | 2017079460 A2 | 5/2017 |
| WO | 2018132608 A2 | 7/2018 |
| WO | 2019040800 A1 | 2/2019 |
| WO | 2019084491 A1 | 5/2019 |
| WO | 2019084494 A1 | 5/2019 |
| WO | 2019140277 A2 | 7/2019 |
| WO | 2019161134 A1 | 8/2019 |
| WO | 2019168986 A1 | 9/2019 |
| WO | 2020038118 A1 | 2/2020 |
| WO | 2020097512 A2 | 5/2020 |

OTHER PUBLICATIONS

Gurghian, A., et al., "DeepLanes: End-To-End Lane Position Estimation using Deep Neural Networks", 2016 IEEE Conference on Computer Vision and Pattern Recognition Workshops, pp. 38-45.

Narote, S., et al., "A review of recent advances in lane detection and departure warning system", Pattern Recognition, Elsevier, 73, pp. 216-234 (2018).

Nguyen, T., "Evaluation of Lane Detection Algorithms based on an Embedded Platform", Master Thesis, Technische Universität Chemnitz, Jun. 2017, available at https://nbn-resolving.org/urn:nbn:de:bsz:ch1-qucosa-226615.

(56) References Cited

OTHER PUBLICATIONS

Niu, J., et al., "Robust Lane Detection using Two-stage Feature Extraction with Curve Fitting", Pattern Recognition, Elsevier, 59, pp. 225-233 (2016).
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Kyoungho Ahn, Hesham Rakha, "The Effects of Route Choice Decisions on Vehicle Energy Consumption and Emissions", Virginia Tech Transportation Institute, date unknown.
Office Action Mailed in Chinese Application No. 201810025516.X, dated Sep. 3, 2019.
Luo, Yi et al. U.S. Appl. No. 15/684,389 Notice of Allowance dated Oct. 9, 2019.
Aharon Bar Hillel et al., Recent Progress in Road and Lane Detection—A survey.
International Search Report and Written Opinion for PCT/US19/060547, dated Jun. 25, 2020.
Office Action for Chinese Application No. 201810025516.X, dated Sep. 3, 2019.
Athanasiadis, Thanos et al., "Semantic Image Segmentation and Object Labeling", IEEE Transactions on Circuits and Systems for Video Technology, 17(3).
Cordts, Marius et al., "The Cityscapes Dataset for Semantic Urban Scene Understanding", Proceedings of the IEEE Computer Society Conference on Computer Vision and Pattern Recognition {CVPR}, Las Vegas.
Paszke, Adam et al., "Enet: A deep neural network architecture for real-time semantic segmentation", CoRR, abs/1606.02147.
Richter, Stephen et al., "Playing for Data: Ground Truth from Computer Games", Intel Labs, European Conference on Computer Vision (ECCV), Amsterdam, the Netherlands.
Somani, Adhiraj et al., "DESPOT: Online POMDP Planning with Regularization", Department of Computer Science, National University of Singapore, date unknown.
Szeliski, Richard, "Computer Vision: Algorithms and Applications", http://szeliski.org/Book/.
Yang, C., "Neural Network-Based Motion Control of an Underactuated Wheeled Inverted Pendulum Model", IEEE Transactions on Neural Networks and Learning Systems, 25(11), 2004-2016.
International Search Report and Written Opinion for PCT/US19/18113, dated May 8, 2019.
Chinese Patent Office, First Search Report for CN 201980013350.2, dated Feb. 21, 2022, 3 pages with machine translation.
Chinese Patent Office, First Office Action for CN 201980013350.2, dated Feb. 25, 2022, 20 pages with machine translation.
Harry Y. Oh, U.S. Appl. No. 15/896,077, Non-Final Office Action dated Mar. 13, 2020, pp. 1-21.
Harry Y. Oh, U.S. Appl. No. 15/896,077, Final Office Action dated Jul. 9, 2020, pp. 1-30.
Harry Y. Oh, U.S. Appl. No. 15/896,077, Non-Final Office Action dated Oct. 1, 2020, pp. 1-34.
Harry Y. Oh, U.S. Appl. No. 16/184,926, Non-Final Office Action dated Oct. 5, 2020, pp. 1-17.
Mingdong Wang et al., U.S. Appl. No. 16/184,926 Notice of Allowance dated Jan. 15, 2021, pp. 1-5.
Extended European Search Report for European Patent Application No. 21166828.0, dated Aug. 5, 2021 (8 pages).
Carle, Patrick J.F., "Global Rover Localization by Matching Lidar and Orbital 3D Maps.", IEEE, Anchorage Convention Distriction, pp. 1-6, May 3-8, 2010. (Anchorage Alaska, US), May 3-8, 2019.
Caselitz, T. et al., "Monocular camera localization in 3D LiDAR maps," European Conference on Computer Vision (2014) Computer Vision—ECCV 2014. ECCV 2014. Lecture Notes in Computer Science, vol. 8690. Springer, Cham.
Mur-Artal, R. et al., "ORB-SLAM: A Versatile and Accurate Monocular SLAM System," IEEE Transaction on Robotics, Oct. 2015, pp. 1147-1163, vol. 31, No. 5, Spain.
Sattler, T. et al., "Are Large-Scale 3D Models Really Necessary for Accurate Visual Localization?" CVPR, IEEE, 2017, pp. 1-10.
Engel J., et al., LSD-SLAM: Large-Scale Direct Monocular SLAM. In: Fleet D., Pajdla T., Schiele B., Tuytelaars T. (eds) Computer Vision—ECCV 2014. ECCV 2014. Lecture Notes in Computer Science, vol. 8690. Springer, Cham.
Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.
International Application No. PCT/US2019/013322, International Search Report and Written Opinion dated Apr. 2, 2019.
International Application No. PCT/US19/12934, International Search Report and Written Opinion dated Apr. 29, 2019.
International Application No. PCT/US18/53795, International Search Report and Written Opinion dated Dec. 31, 2018.
International Application No. PCT/US18/57484, International Search Report and Written Opinion dated Jan. 7, 2019.
International Application No. PCT/US2018/057851, International Search Report and Written Opinion dated Feb. 1, 2019.
International Application No. PCT/US2019/019839, International Search Reort and Written Opinion dated May 23, 2019.
International Application No. PCT/US19/25995, International Search Report and Written Opinion dated Jul. 9, 2019.
Geiger, Andreas et al., "Automatic Camera and Range Sensor Calibration using a single Shot", Robotics and Automation (ICRA), pp. 1-8, 2012 IEEE International Conference.
Zhang, Z. et al. A Flexible new technique for camera calibration. IEEE Transactions on Pattern Analysis and Machine Intelligence (vol. 22, Issue: 11, Nov. 2000).
International Application No. PCT/US2018/047830, International Search Report and Written Opinion dated Apr. 27, 2017.
Bar-Hillel, Aharon et al. "Recent progress in road and lane detection: a survey." Machine Vision and Applications 25 (2011): 727-745.
Schindler, Andreas et al. "Generation of high precision digital maps using circular arc splines," 2012 IEEE Intelligent Vehicles Symposium, Alcala de Henares, 2012, pp. 246-251. doi: 10.1109/IVS.2012.6232124.
International Application No. PCT/US2018/047608, International Search Report and Written Opinion dated Dec. 28, 2018.
Hou, Xiaodi and Zhang, Liqing, "Saliency Detection: A Spectral Residual Approach", Computer Vision and Pattern Recognition, CVPR'07—IEEE Conference, pp. 1-8, 2007.
Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.
Hou, Xiaodi and Zhang, Liqing, "Dynamic Visual Attention: Searching For Coding Length Increments", Advances in Neural Information Processing Systems, vol. 21, pp. 681-688, 2008.

(56) References Cited

OTHER PUBLICATIONS

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701.01036, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 Issue 12, pp. 1498-1515 Article first published online: Oct. 7, 2010; Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

VERIFICATION MODULE SYSTEM AND METHOD FOR MOTION-BASED LANE DETECTION WITH MULTIPLE SENSORS

CROSS-REFERENCE TO RELATED DOCUMENTS

This patent application is a continuation of U.S. patent application Ser. No. 15/683,441, titled "VERIFICATION MODULE SYSTEM AND METHOD FOR MOTION-BASED LANE DETECTION WITH MULTIPLE SENSORS," filed on Aug. 22, 2017, the disclosure of which is hereby incorporated by reference in its entirety. This patent document is related to U.S. patent application Ser. No. 15/683,463, titled "DEEP MODULE AND FITTING MODULE SYSTEM AND METHOD FOR MOTION-BASED LANE DETECTION WITH MULTIPLE SENSORS," filed on Aug. 22, 2017, and U.S. patent application Ser. No. 15/683,494, titled "POST-PROCESSING MODULE SYSTEM AND METHOD FOR MOTIONED-BASED LANE DETECTION WITH MULTIPLE SENSORS," filed on Aug. 22, 2017, which are incorporated herein by reference in their entirety for all purposes.

FIELD OF THE DISCLOSURE

The field of the disclosure is in general related to autonomous vehicles and, in particular, to a method and system for lane detection.

BACKGROUND OF THE DISCLOSURE

Increasing safety and reducing road accidents, thereby saving lives are of great interest in the context of Advanced Driver Assistance Systems. Intelligent and autonomous vehicles are promising solutions to enhance road safety, reduce traffic issues, and improve passengers' comfort. Among the complex and challenging tasks of road vehicles is road lane detection or road boundaries detection. Such detection is based on lane detection, which includes the localization of the road, the determination of the relative position between vehicle and road, and the analysis of the vehicle's heading direction. Lane marking, a main component on a highway, instructs an autonomous vehicle to interactively and safely drive on the highway. Even though a differential global positioning system (GPS) has become affordable, the precision of localization may not be desirably stable. Moreover, the control requires a precise location according to lanes in a current view.

BRIEF SUMMARY OF THE DISCLOSURE

Various objects, features, aspects and advantages of the present embodiment will become more apparent from the following detailed description of embodiments of the embodiment, along with the accompanying drawings in which like numerals represent like components.

Embodiments of the present disclosure provide a method of lane detection for a non-transitory computer readable storage medium storing one or more programs. The one or more programs include instructions, which when executed by a computing device, cause the computing device to perform the following steps comprising: generating a ground truth associated with lane markings expressed in god's view; receiving features from at least one of a hit-map image and a fitted lane marking, wherein the hit-map image includes a classification of pixels that hit a lane marking, and the fitted lane marking includes pixels optimized based on the hit-map image; and training a confidence module based on the features and the ground truth, the confidence module configured to determine on-line whether a fitted lane marking is reasonable, using parameters that express a lane marking in an arc.

In an embodiment, generating a ground truth includes: generating a labeled lane marking by annotating a lane marking, using the parameters.

In another embodiment, the method further comprises: training a lane detection algorithm by using the ground truth; and generating a hit-map image for a current view based on the lane detection algorithm.

In still another embodiment, the method further comprises: generating a fitted lane marking based on the hit-map image and a lane template that includes features of a view immediately previous to the current view.

In yet another embodiment, generating a fitted lane marking includes: optimizing, based on priors or constraints, the lane template to obtain a local optimal.

In yet still another embodiment, the method further comprises: determining that a confidence level of the fitted lane marking is reasonable, using the parameters; and outputting the fitted lane marking as a predicted lane marking.

In an embodiment, the method further comprises: comparing the fitted lane marking having a reasonable confidence level against the ground truth; and determining a failure pattern associated with the fitted lane marking when a comparison result indicates that the fitted lane marking fails to match the ground truth.

In yet another embodiment, the method further comprises: determining that a confidence level of the fitted lane is unreasonable, using the parameters; and rejecting the fitted lane marking.

In still another embodiment, the method further comprises: comparing the fitted lane marking having an unreasonable confidence level against the ground truth; and determining a failure pattern associated with the fitted lane marking when a comparison result indicates that the fitted lane marking matches the ground truth.

In still yet another embodiment, the method further comprises: refining the confidence module by adding additional labeled data in training the confidence module.

Embodiments of the present disclosure also provide a system for lane detection. The system includes an internet server that comprises: an I/O port, configured to transmit and receive electrical signals to and from a client device; a memory; one or more processing units; and one or more programs stored in the memory and configured for execution by the one or more processing units, the one or more programs including instructions for: generating a ground truth associated with lane markings expressed in god's view; receiving features from at least one of a hit-map image and a fitted lane marking, wherein the hit-map image includes a classification of pixels that hit a lane marking, and the fitted lane marking includes pixels optimized based on the hit-map image; and training a confidence module based on the features and the ground truth, the confidence module configured to determine on-line whether a fitted lane marking is reasonable, using parameters that express a lane marking in an arc.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

Figure 1:
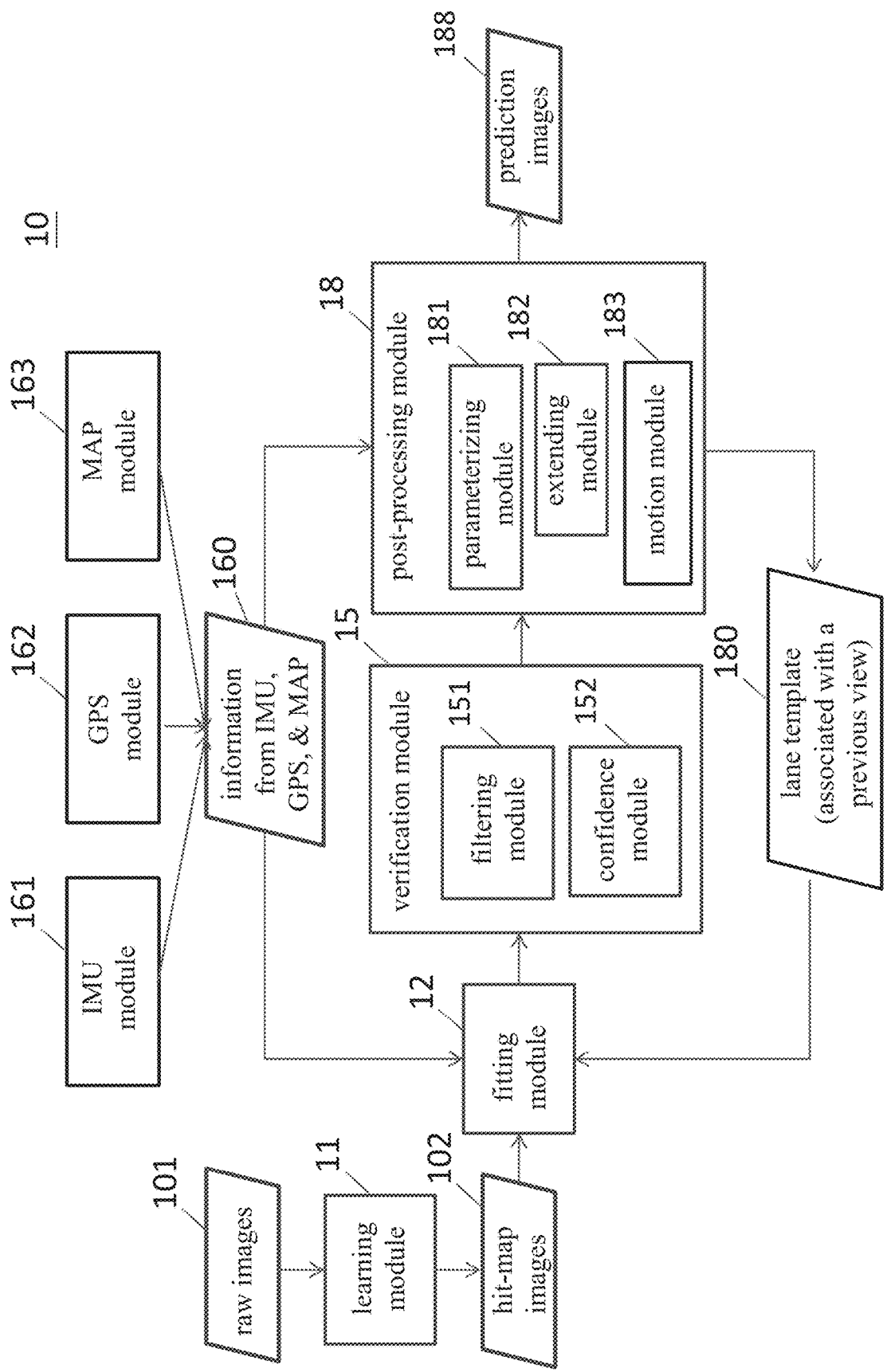
FIG. 1 is a block diagram of a system for on-line lane detection, in accordance with an embodiment.

The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

Any alterations and modifications in the described embodiments, and any further applications of principles described in this document are contemplated as would normally occur to one of ordinary skill in the art to which the disclosure relates. Specific examples of components and arrangements are described below to simplify the present disclosure. These are, of course, merely examples and are not intended to be limiting. For example, when an element is referred to as being "connected to" or "coupled to" another element, it may be directly connected to or coupled to the other element, or intervening elements may be present.

In the drawings, the shape and thickness may be exaggerated for clarity and convenience. This description will be directed in particular to elements forming part of, or cooperating more directly with, an apparatus in accordance with the present disclosure. It is to be understood that elements not specifically shown or described may take various forms. Reference throughout this specification to "one embodiment" or "an embodiment" means that a particular feature, structure, or characteristic described in connection with the embodiment is included in at least one embodiment.

In the drawings, the figures are not necessarily drawn to scale, and in some instances the drawings have been exaggerated and/or simplified in places for illustrative purposes. One of ordinary skill in the art will appreciate the many possible applications and variations of the present disclosure based on the following illustrative embodiments of the present disclosure.

The appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. It should be appreciated that the following figures are not drawn to scale; rather, these figures are merely intended for illustration.

It will be understood that singular forms "a", "an" and "the" are intended to include the plural forms as well, unless the context clearly indicates otherwise. Furthermore, relative terms, such as "bottom" and "top," may be used herein to describe one element's relationship to other elements as illustrated in the Figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result.

In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Reference is now made to the drawings wherein like numerals refer to like parts throughout.

As used herein, the term "wireless" refers to wireless communication to a device or between multiple devices. Wireless devices may be anchored to a location and/or hardwired to a power system, depending on the needs of the business, venue, event or museum. In one embodiment, wireless devices may be enabled to connect to Internet, but do not need to transfer data to and from Internet in order to communicate within the wireless information communication and delivery system.

As used herein, the term "Smart Phone" or "smart phone" or "mobile device(s)" or "cellular phone" or "cellular" or "mobile phone" or the like refers to a wireless communication device, that includes, but not is limited to, an integrated circuit (IC), chip set, chip, system-on-a-chip including low noise amplifier, power amplifier, Application Specific Integrated Circuit (ASIC), digital integrated circuits, a transceiver, receiver, or transmitter, dynamic, static or non-transitory memory device(s), one or more computer processor(s) to process received and transmitted signals, for example, to and from the Internet, other wireless devices, and to provide communication within the wireless information communication and delivery system including send, broadcast, and receive information, signal data, location data, a bus line, an antenna to transmit and receive signals, and power supply such as a rechargeable battery or power storage unit. The chip or IC may be constructed ("fabricated") on a "die" cut from, for example, a Silicon, Sapphire, Indium Phosphide, or Gallium Arsenide wafer. The IC may be, for example, analogue or digital on a chip or hybrid combination thereof. Furthermore, digital integrated circuits may contain anything from one to thousands or millions of signal invertors, and logic gates, e.g., "and", "or", "nand" and "nor gates", flipflops, multiplexors, etc., on a square area that occupies only a few millimeters. The small size of, for instance, IC's allows these circuits to provide high speed operation, low power dissipation, and reduced manufacturing cost compared with more complicated board-level integration.

As used herein, the terms "wireless", "wireless data transfer," "wireless tracking and location system," "positioning system" and "wireless positioning system" refer without limitation to any wireless system that transfers data or communicates or broadcasts a message, which communication may include location coordinates or other information using one or more devices, e.g., wireless communication devices.

As used herein, the terms "module" or "modules" refer without limitation to any software, software program(s), firmware, or actual hardware or combination thereof that has been added on, downloaded, updated, transferred or originally part of a larger computation or transceiver system that assists in or provides computational ability including, but not limited to, logic functionality to assist in or provide communication broadcasts of commands or messages, which communication may include location coordinates or communications between, among, or to one or more devices, e.g., wireless communication devices.

In some embodiments in accordance with the present disclosure, a non-transitory, i.e., non-volatile, computer readable storage medium is provided. The non-transitory computer readable storage medium is stored with one or more programs. When the program is executed by the processing unit of a computing device, i.e., that are part of a vehicle, the computing device is caused to conduct specific operations set forth below in accordance with some embodiments of the present disclosure.

Figure 8:
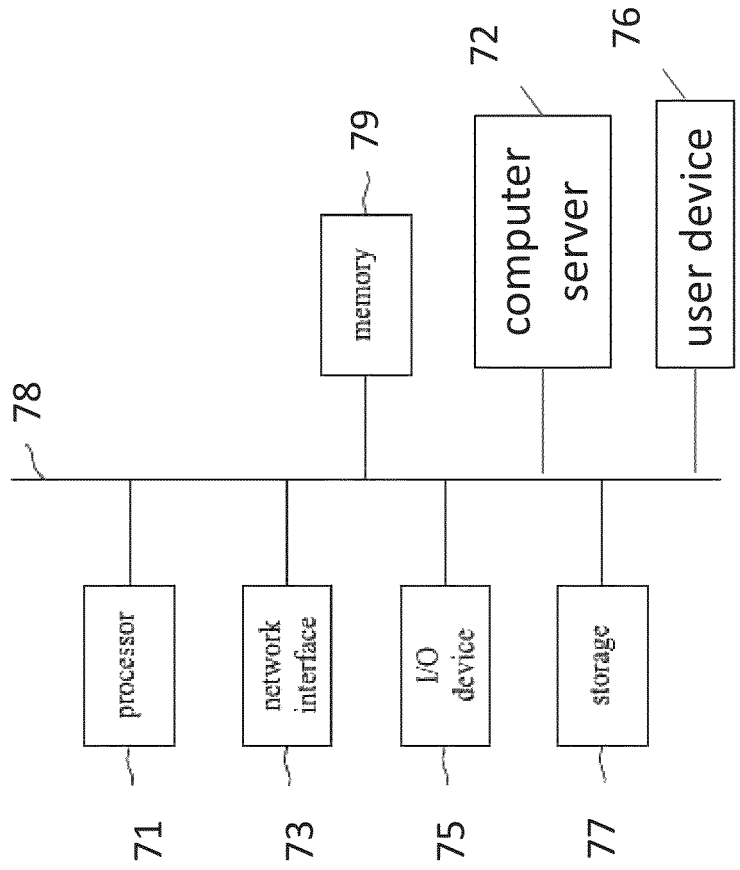
FIG. 8 is a block diagram of a system for lane detection, in accordance with some embodiments.

In some embodiments, as illustrated in FIG. 8, examples of non-transitory storage computer readable storage medium may include magnetic hard discs, optical discs, floppy discs, flash memories, or forms of electrically programmable memories (EPROM) or electrically erasable and programmable (EEPROM) memories. In certain embodiments, the term "non-transitory" may indicate that the storage medium is not embodied in a carrier wave or a propagated signal. In some embodiments, a non-transitory storage medium may store data that can, over time, change (e.g., in RAM or cache).

In some embodiments in accordance with the present disclosure, in operation, a client application is transmitted to the computing device upon a request of a user, for example, by a smart phone 76 (see FIG. 8). For example, the first client device 76 may be a smart phone downloading the application from a computer server. In operation, the application is installed at the vehicle. Accordingly, specific functions may be executed by the user through a computing device, such as calibrating sensors and time synchronization, and, for example, sending and receiving calibration files for data alignment purposes.

FIG. 1 is a block diagram of a system 10 for on-line lane detection, in accordance with an embodiment. Referring to FIG. 1, the system 10 includes a learning module 11, a fitting module 12, a verification module 15 and a post-processing module 18.

Figure 2A:
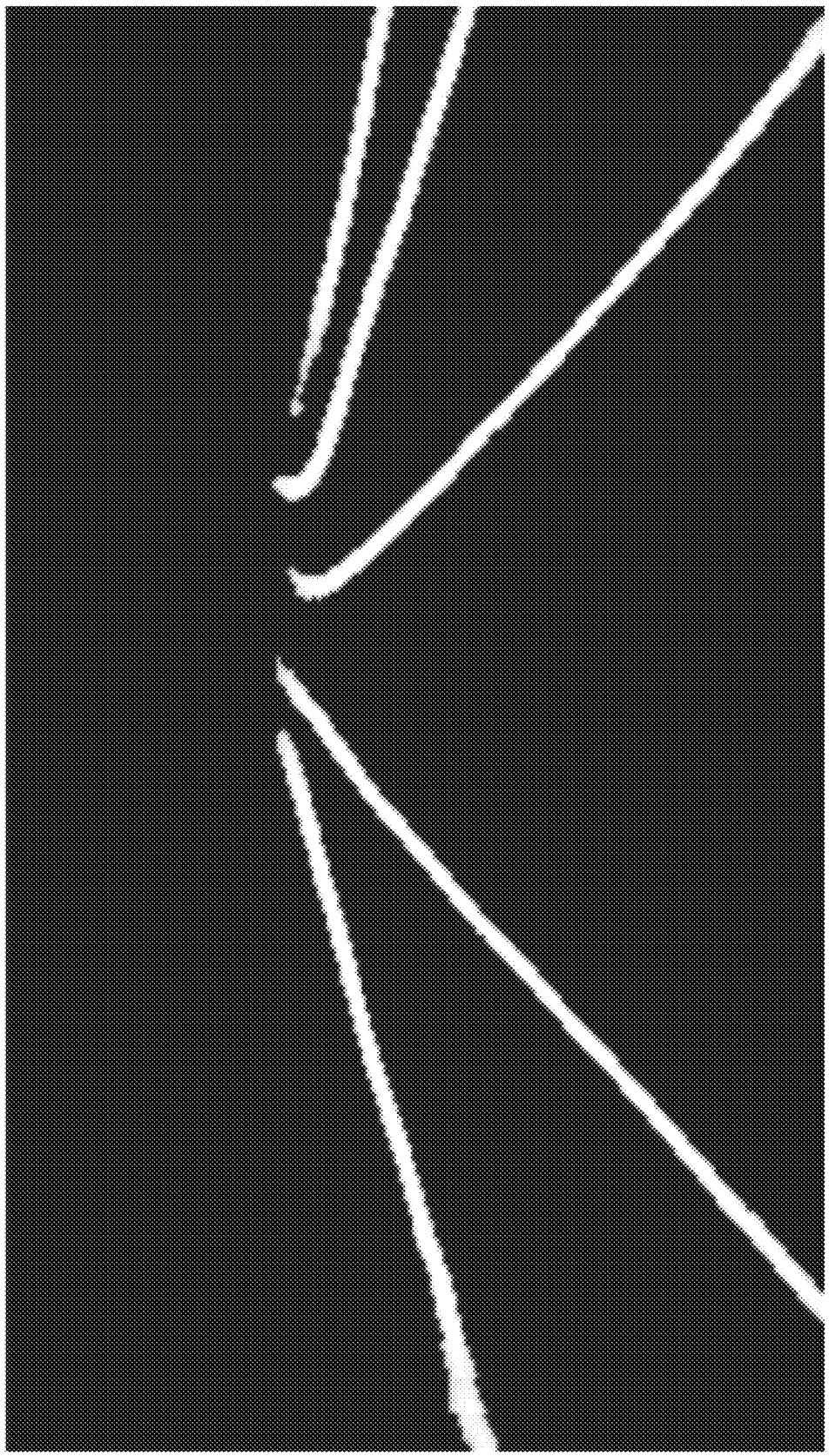
FIG. 2A is a diagram of an exemplary hit-map image generated by a learning module illustrated in FIG. 1.

The learning module 11 is configured to, based on a function or algorithm for lane detection, generate a hit-map image 102 in response to a raw image 101 of a current view. The raw image 101 is provided by sensors mounted on a vehicle, which may include at least one camera, a light detection and ranging (LiDAR) sensor, an inertial measurement unit (IMU) module 161, a global positioning system (GPS) module 162 and a mapping (MAP) module 163. In addition, the raw image 101 in an embodiment may include an RGB image captured by the at least one camera and a point cloud generated by the LiDAR. The lane detection algorithm can be expressed in a set of parameters that describe a relationship between the real time raw image 101 and the hit-map image 102. Also, the lane detection algorithm may be achieved through an off-line machine learning process 23 (FIG. 3) that will be discussed in detail with reference to FIG. 3. Moreover, the lane detection algorithm may be refined by a testing process 24 (FIG. 3) that will be discussed with reference to FIG. 3. The hit-map image 102 represents a classification of pixels that hit a lane marking. FIG. 2A is a diagram of an exemplary hit-map image 102 generated by the learning module 11.

The fitting module 12 is configured to generate a fitted lane marking for the current view in response to the hit-map image 102 from the learning module 11 and a lane template 180 from the processing module 18. In the present embodiment, with the help of the IMU module 161, GPS module 162 and MAP module 163, the lane marking is expressed in god's view, which means that when a car including the system 10 is taken as an origin, the orient of the car is the y-coordinate while the perpendicular direction of the car is the x-coordinate. In an embodiment, the fitting module 12, based on the hit-map image 102, optimizes points in the lane template 180 to obtain a local optimal. The lane template 180 represents an image of a view, having been processed by the processing module 18, immediately previous to the current view. The lane template 180 thus includes features of a previous view, and may include additional features, if any, from the post-processing module 18. Moreover, the lane template 180 is used to enhance the fitting speed and precision of the fitting module 12, which in turn facilitates the precision of a next lane template. During a fitting process, the fitting module 12 may use, but are not limited to, the following priors or constraints of a road:

(1) lane markings on a highway are parallel to each other;

(2) the shape of curvatures of lanes on a highway is a circle;

(3) the curvature of lanes on a highway is smaller than approximately three hundred (300) meters;

(4) the lane spacing between neighboring lanes on a highway ranges between approximately three and four (3-4) meters, for example, approximately 3.75 meters; and (5) the color at an edge of a lane marking is different from that at other portions of a highway absent from a lane marking.

These and other priors and constraints facilitate the optimization process in the fitting module 12. Moreover, providing a lane template associated with a previous view, as in the present embodiment of FIG. 1, further facilitates the optimization process in the fitting module 12.

The verification module 15 is configured to determine if a fitting result from the fitting module 12 is reasonable. The verification module 15 includes a filtering module 151 and a confidence module 152. The filtering module 151 is configured to remove incorrect or unreasonable fitted lines of lane markings based on the priors and constraints. The confidence module 152 is configured to determine a confidence level of each fitted lane markings. The confidence of a fitted lane marking facilitates a self-diagnosis in the processing module 18. Function or parameters employed in the confidence module 152 may be achieved through an off-line confidence training process 35 (FIG. 4A) that will be discussed in detail with reference to FIG. 4A.

The post-processing module 18 is configured to output an image of the current view, and generate a lane template for a next view. The post-processing module 18 includes a parameterizing module 181, an extending module 182 and a motion module 183 for lane markings, all of which facilitate optimization of the lane detection algorithm. The parameterizing module 181 is configured to fit a fitted lane marking into, for example, an arc of a circle, resulting in a predicted image 188. Therefore, the lane detection algorithm includes a set or parameters to express a lane marking in an arc. In addition, the verification module 15 determines, based on the parameters for lane markings, whether a fitted lane marking from the fitting module 12 is reasonable. The predicted image 188 is sent to a control system (not shown) for an upper motion planning.

The extending module 182 is configured to, based on priors and constraints, extend a fitted lane marking. In an embodiment, extending a fitted lane marking includes increasing the number of fitted lane markings in a lane template 180. For example, for a lane template that contains two fitted lane markings for the current view, by adding another two fitted lane markings, the next lane template contains four fitted lane markings for the next view. With the additional information on fitted lane marking, effectively, the fitting speed and precision of the fitting module 12 can be enhanced. Alternatively, the extending module 182 is configured to, based on a high-definition (HD) map, extend a fitted lane marking. The processing module 18 sends a lane template 180 associated with the current view to the fitting module 12 for use in the lane detection of a next view.

The motion module 183 takes advantage of information 160 from the IMU module 161, GPS module 162 and MAP module 163, and generates a lane template 180 based on a processed result from at least one of the parameterizing module 181 and the extending module 182. In an embodiment, the IMU module 161, GPS module 162 and MAP module 163 are configured to provide information on lanes under detection. The motion module 183 is configured to express a lane marking result from at least one of the parameterizing module 181 and the extending module 182 in god's view or a bird-eye's view and, using the information 160 from the IMU module 161, GPS module 162 and MAP module 163, obtain a more precise lane marking, which then serves as a lane template 180 associated with a previous view.

In an embodiment, the GPS module 162 provides geo-location information on at least one of a lane width, the number of lanes and a lane curvature. In addition, the IMU module 161 provides information on a vehicle pose. The pose of a vehicle is essential information for lane detection, in particular in some embodiments the lane detection algorithm according to the present disclosure is built under god's view, which means that a precise vehicle pose and a view-transformation matrix are advantageous. Also, the IMU module 161 provides information of the speed of the vehicle. As a result, the vehicle can move in a detected lane map and a better lane template can be obtained for use in lane detection of a next view. The MAP module 163, which may use the simultaneous localization and mapping (SLAM), facilitates the autonomous car to create a map of its surroundings, and orient the autonomous car itself properly within this map in real time. Effectively, with the information 160 from the IMU module 161, GPS module 162 and MAP module 163, and the lane template 180 from the motion module 183, the running time is reduced and the detection result is improved in the system 10.

Figure 2B:
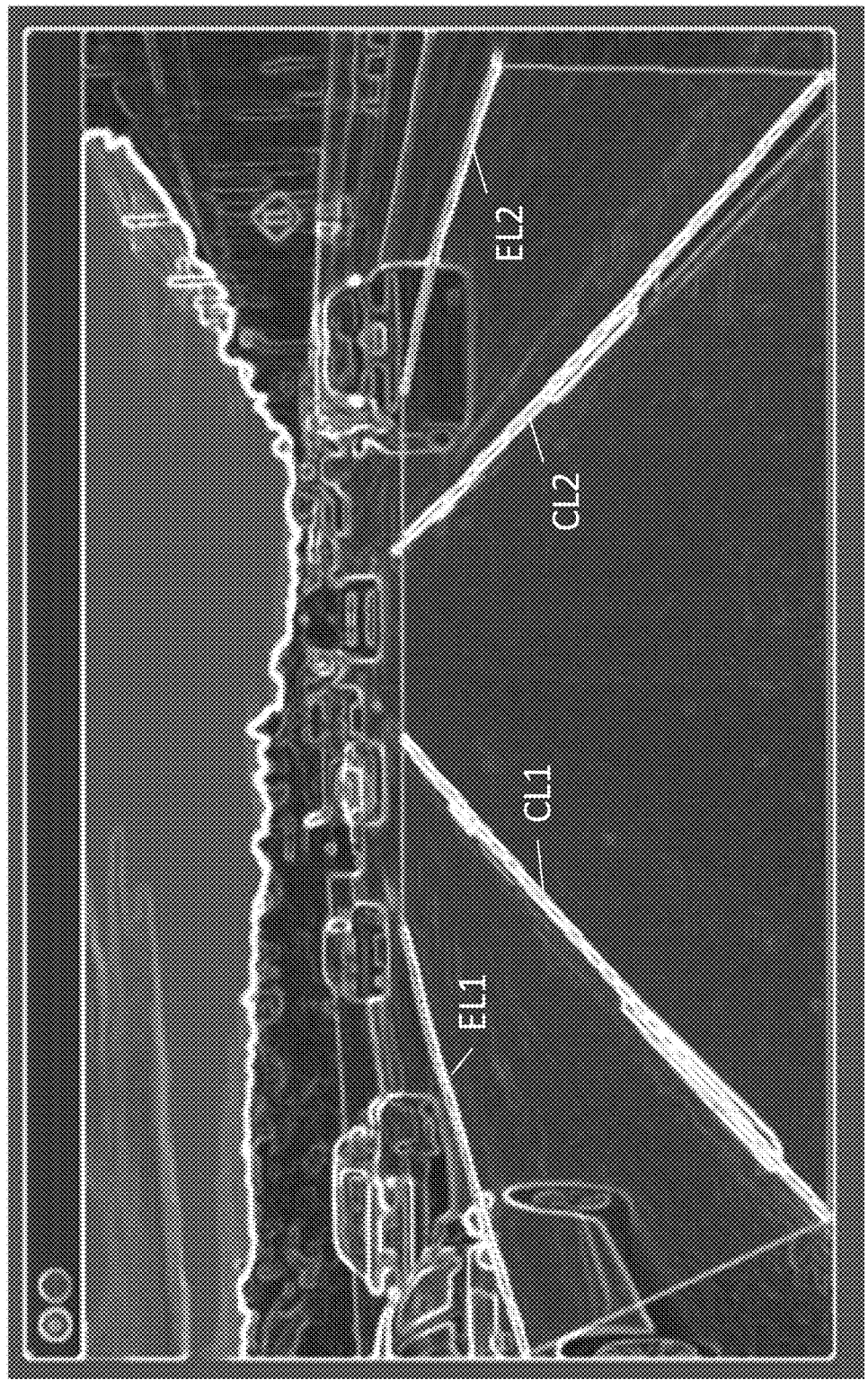
FIG. 2B is a diagram of an exemplary lane template generated, based on a previous view, by a motion module for lane markings illustrated in FIG. 1.
Figure 2C:
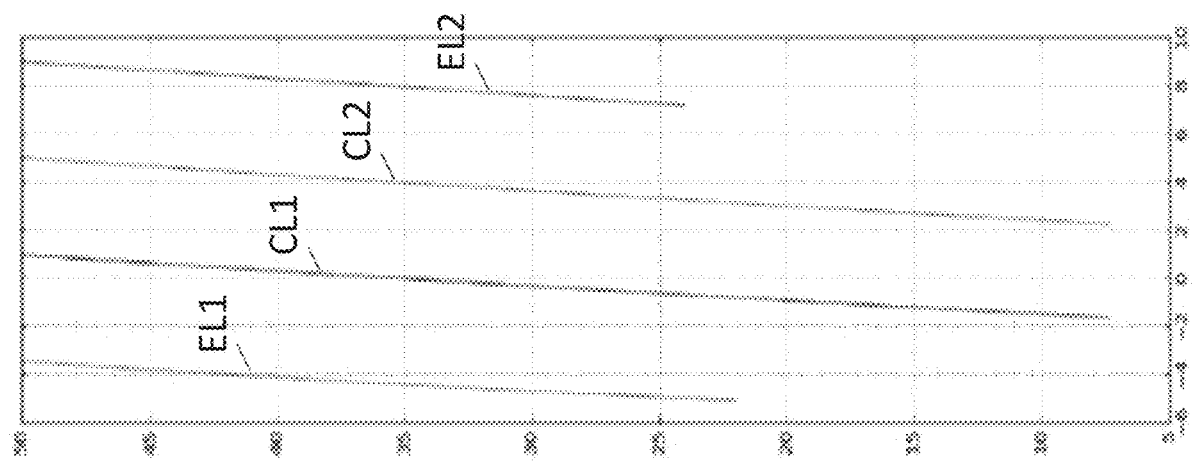
FIG. 2C is a schematic diagram of lane markings expressed in god's view, in accordance with an embodiment.

FIG. 2B is a diagram of an exemplary lane template 180 generated, based on a previous view, by the motion module 183 for lane markings. Referring to FIG. 2B, there are four lane markings CL1, CL2, EL1 and EL2 in the lane template 180. In the previous view, there may be only two central lane markings CL1 and CL2. The extending module 182 extends lane markings by increasing EL1 and EL2 for the previous view, resulting in the four lane markings CL1, CL2, EL1 and EL2. Subsequently, an image frame of the previous view with the four lane markings CL1, CL2, EL1 and EL2 is processed by the motion module 183 in in god's view to improve the precision. FIG. 2C is a schematic diagram of lane markings CL1, CL2, EL1 and EL2 expressed in god's view, in accordance with an embodiment.

Figure 2D:
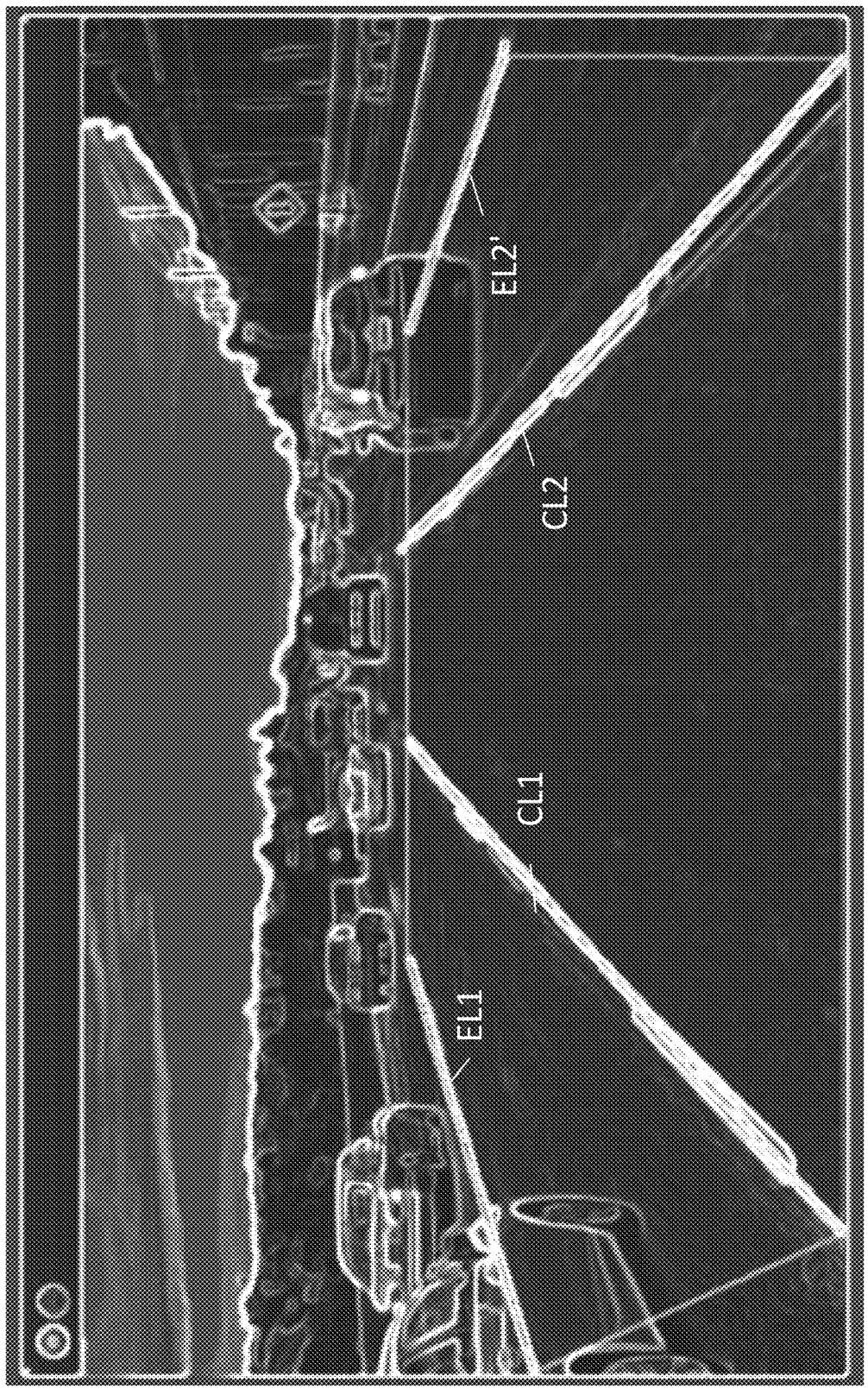
FIG. 2D is a diagram of an exemplary image of fitted lane markings generated for a current view by a fitting module illustrated in FIG. 1.

FIG. 2D is a diagram of an exemplary image 120 of fitted lane markings generated for a current view by the fitting module 12. Based on the hit-map image 102 as illustrated in FIG. 2A and the lane template 180 as illustrated in FIG. 2B, an image 120 of fitted lane markings CL1, CL2, EL1 and EL2' is generated. With the help of the lane template 180 from the post-processing module 18, a better result of fitting than that generated without any lane template can be expected. In addition, the image 120 is expected to be more precise than the lane template 180. For example, referring to FIG. 2D, the lane marking EL2' in the image 120 is more precise (which looks more like a straight line) than the lane marking EL2 in the lane template 180. The better fitted image 120, when passes a confidence check in the verification module 15, is then used as a basis for generating a new lane template for a next view by the motion module 183. The iteration process of generating a better lane template and a better fitted lane marking result facilitates a more robust and reliable lane detection algorithm. Moreover, as will be further discussed, if a fitted lane marking fails a confidence check or a predicted image 188 fails a testing check, the lane detection algorithm is refined, which also results in a more robust and reliable lane detection algorithm.

The lane detection system 10 makes it possible to utilize multiple sensors including IMU, GPS and MAP and take advantage of the information from these sensors. Some existing approaches, however, since no such algorithm for lane detection is built under god's view, may not achieve the desired effects of the present disclosure. Furthermore, in the system 10, a lot of priors coming from GPS, IMU and an HD map may be used. For example, with the real lane width at a present position available, a more precise lane template can be generated for the next view, which significantly accelerates optimization of the confidence module 152 and the lane detection algorithm. Other priors, such as the curvature of lanes and the number of lanes, also facilitate the optimization process. In some embodiment, the fitting module 12 may be configured to optimize, based on priors including the information from the GPS, the lane template associated with a previous view. Also, the filtering module 151 of the verification module 15 may be configured to rule out, based on priors including the information from the GPS, incorrect fitting lines of the fitted lane marking.

Figure 3:
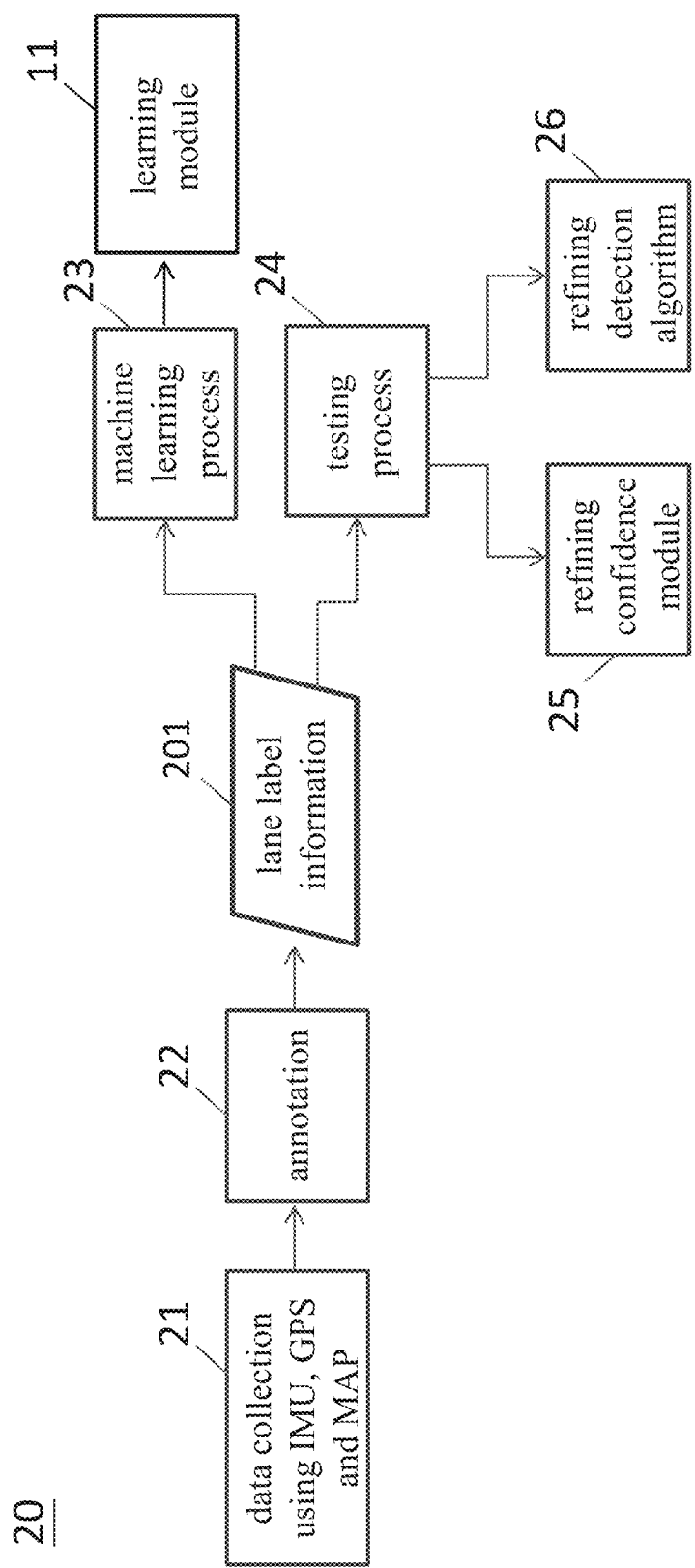
FIG. 3 is a schematic diagram showing a method of supporting the on-line lane detection system illustrated in FIG. 1, in accordance with some embodiments.

FIG. 3 is a schematic diagram showing a method 20 of supporting the on-line lane detection system 10 illustrated in FIG. 1, in accordance with some embodiments. The method 20 may be performed offline. Referring to FIG. 3, the method 20 includes operations of data collection 21, annotation 22, machine learning 23 and testing 24.

The data collection 21 is to collect data by means of sensors. The sensors may include, for example, a LiDAR, at least one camera, an IMU module, a GPS module and a MAP module. Prior to data collection, data alignment, which includes sensor calibration and time synchronization, is performed. A vehicle is equipped with multiple complementary sensors which require calibration in order to represent sensed information in a common coordinate system. The LiDAR sensor and the cameras are mounted on the roof of the vehicle. LiDAR sensors have become increasingly common in both industrial and robotic applications. LiDAR sensors are particularly desirable for their direct distance measurements and high accuracy. In an embodiment according to the present disclosure, the LIDAR sensor is equipped with many simultaneous rotating beams at varying angles, for example, a 64-beam rotating LiDAR. The multiple-beam LiDAR provides at least an order of magnitude more data than a single-beam LiDAR and enables new applications in mapping, object detection and recognition, scene understanding, and simultaneous localization and mapping (SLAM).

The inertial navigation module in an embodiment according to the present disclosure includes a global navigation satellite system (GNSS)-inertial measurement unit (IMU) module or an IMU-global positioning system (GPS) module. The GNSS satellite signals are used to correct or calibrate a solution from the IMU. The benefits of using GNSS with an IMU are that the IMU may be calibrated by the GNSS signals and that the IMU can provide position and angle updates at a quicker rate than GNSS. For high dynamic vehicles, IMU fills in the gaps between GNSS positions. Additionally, GNSS may lose its signal and the IMU can continue to compute the position and angle during the period of lost GNSS signal. The two systems are complementary and are often employed together. An integrated navigation system consisting of IMU and GPS is usually preferred due to the reduced dependency on GPS-only navigator in an area prone to poor signal reception or affected by multipath. The performance of the integrated system largely depends upon the quality of the IMU and the integration methodology. Considering the restricted use of high grade IMU and their associated price, low-cost IMUs are becoming the preferred choice for civilian navigation purposes. MEMS based inertial sensors have made possible the development of civilian land vehicle navigation as it offers small size and low-cost.

The data alignment among the sensors includes calibrating intrinsic parameters of the camera, and calibrating extrinsic parameters among the camera, the LiDAR and the inertial navigation module. In an embodiment, the intrinsic parameters of each beam are calibrated in advance using a supervised method. Also, LiDAR scans are collected in the form of sweep. A sweep is defined as a scan coverage of the LiDAR sensor rotating from 0 degree to 360 degrees. Moreover, motion distortion within the sweep is corrected assuming that the angular and linear velocity of the LiDAR motion is constant.

It is assumed that the environment is generally static and contains some 3D features, i.e., it is not just smooth ground. In order to achieve an accurate calibration, LiDAR measurements are recorded as the vehicle transitions through a series of known poses. Global pose information is irrelevant, as there is no existing map, so only local pose information is required. Local pose data may be acquired in any number of ways, e.g. from a wheel encoder and IMU, from an integrated GPS/IMU system, or from a GPS system with real-time corrections.

In addition to the calibration and transformation, time synchronization among the LiDAR sensor, cameras and inertial navigation module is achieved. Specifically, time synchronization between the LiDAR sensor and the inertial navigation module, between the inertial navigation module and the cameras, and between the LiDAR sensor and the cameras is achieved.

After data alignment, these sensors are used to collect data in an environment. In an embodiment, images of the environment are captured by the cameras in approximately 30 Hz. LiDAR scans are collected in the form of a sweep in approximately 20 Hz. Vehicle poses, including position and orientation, are collected in an "east north up" (ENU) coordinate by the inertial navigation module in approximately 50 Hz.

In the operation of annotation 22, data collected are labeled with lane markings by, for example, annual annotation. The labeled lane markings or labeled data 201, which indicate whether a lane marking exists, serve as a ground truth for input to the machine learning process 23 using, for example, a convolution neural network (CNN) for a deep module training and to a testing process 24 for a test. The labeled lane markings 201 are used to train a lane detection algorithm during the machine learning process 23, resulting in a set of parameters for use in the learning module 11 for generating hit-map images 102 described and illustrated with reference to FIG. 1. Moreover, a predicted image 188 of the system 10 is compared against the labeled lane markings 201 in the testing process 24 to determine whether the predicted image 188 is correct. If the testing 24 shows that the predicted image 188 is not correct or not desirable, then in operation 25 either a confidence module 152 is refined, or in operation 26 the lane detection algorithm is refined, or both are refined. The confidence module 152 may be trained and refined, as will be further discussed with reference to FIG. 3A. For the refinement of confidence module 152 or lane detection algorithm, more labeled data 201 are input so as to determine what scenarios cause the confidence module 152 or the lane detection algorithm to fail in the testing process 24. In addition, with more labeled data 201 being input, parameters resulting from the machine learning process 23 are optimized. Accordingly, the learning module 11 described and illustrated with reference to FIG. 1 can be fine-tuned due to optimization of the parameters. Moreover, the verification module 15 or more specifically the confidence module 152 thereof is refined. Also, the lane detection algorithm can be refined, for example, in logistic and become optimized.

Figure 4A:
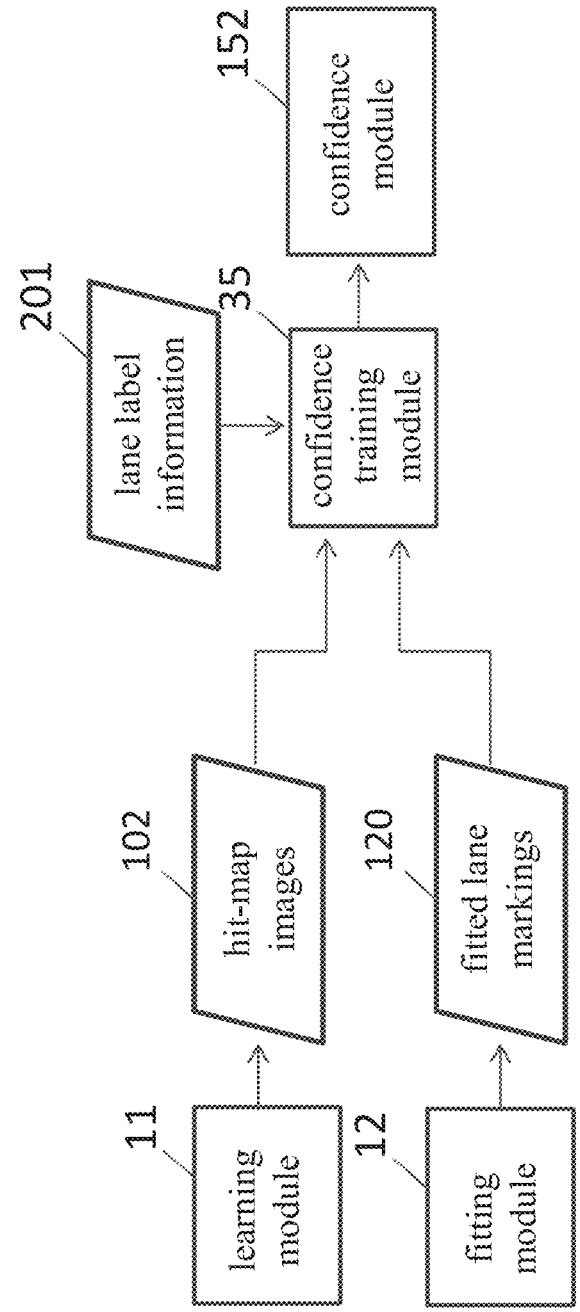
FIG. 4A is a schematic block diagram of a system for refining a confidence module illustrated in FIG. 1, in accordance with some embodiments.

FIG. 4A is a schematic block diagram of a system 30 of refining the confidence module 152 illustrated in FIG. 1, in accordance with some embodiments.

Referring to FIG. 4A, the system 30 includes a confidence training module 35, which may be considered to be a machine learning system. The confidence training module 35 is configured to train features from at least one of the learning module 11 and the fitting module 12 by using the labeled lane markings 201, and thereby generate a function or algorithm for confidence evaluation for use in the confidence module 152. Also, as previously discussed with reference to FIG. 3, with more information on labeled lane markings 201, the confidence module 152 can thereby be refined through the training process in the confidence training module 35. Also, since the learning module 11 can be refined by the additional information on labeled lane markings 201, the confidence module 152 can accordingly be refined through the training process. In addition, since the fitting module 12 can be refined due to the learning module 11 being refined, the confidence module 152 can accordingly be refined through the training process.

Moreover, the confidence training module 35 is configured to determine a failure pattern associated with the fitted lane marking. Through an analysis of failure patterns, features of various failure events may be explored. The failure events may include incorrect or unreasonable fitted lane markings from the fitting module 12. A result of the analysis may thus be used to optimize the confidence module 152 and the lane detection algorithm. The result of the analysis may be indicated automatically or manually.

As a result, for on-line operation, if confidence of a fitted lane marking from the confidence module 152 falls within or beyond a predetermined threshold, the confidence module 152 outputs the fitted lane marking for the prediction of the line(s) or marking(s) of a lane. In contrast, if confidence of a fitted lane marking from the confidence module 152 falls behind the predetermined threshold, the fitted lane marking is rejected. For off-line training, confidence of a fitted lane marking from the confidence module 152 is compared against a ground truth. If the confidence does not match the ground truth, a failure event is recognized and then analyzed to determine a failure pattern so as to refine the confidence module 152.

Figure 4B:
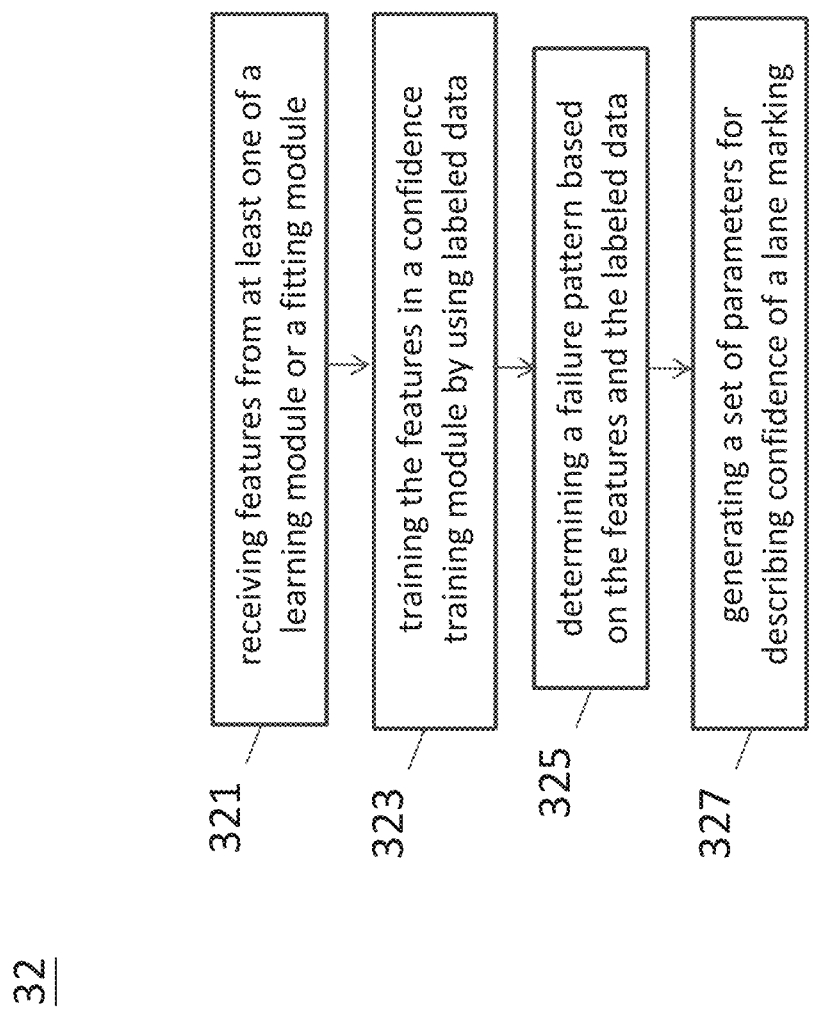
FIG. 4B is a flow diagram showing a method of refining a confidence module illustrated in FIG. 1, in accordance with some embodiments.

FIG. 4B is a flow diagram showing a method 32 of refining the confidence module 152 illustrated in FIG. 1, in accordance with some embodiments.

Referring to FIG. 4B and also FIG. 4A, in operation 321, features from at least one of the learning module 11 or the fitting module 12 are received.

Next, in operation 323, the features are trained in the confidence training module 35 by using labeled data 201.

In operation 325, a failure pattern is determined based on the features and the labeled data 201.

Moreover, in operation 327, a set of parameters for describing confidence of a lane marking is generated. The set of parameters serve as an algorithm for confidence evaluation in the confidence module 152.

Furthermore, by providing additional information on labeled data 201 to the confidence training module 35, the confidence module 152 can be refined or optimized. Also, with the additional information on labeled data 201, the learning module 11 can be refined, and in turn the confidence module 152 can accordingly be refined or optimized through the training process. In addition, since the fitting module 12 can be refined due to the learning module 11 being refined, the confidence module 152 can accordingly be refined or optimized through the training process.

Figure 5:
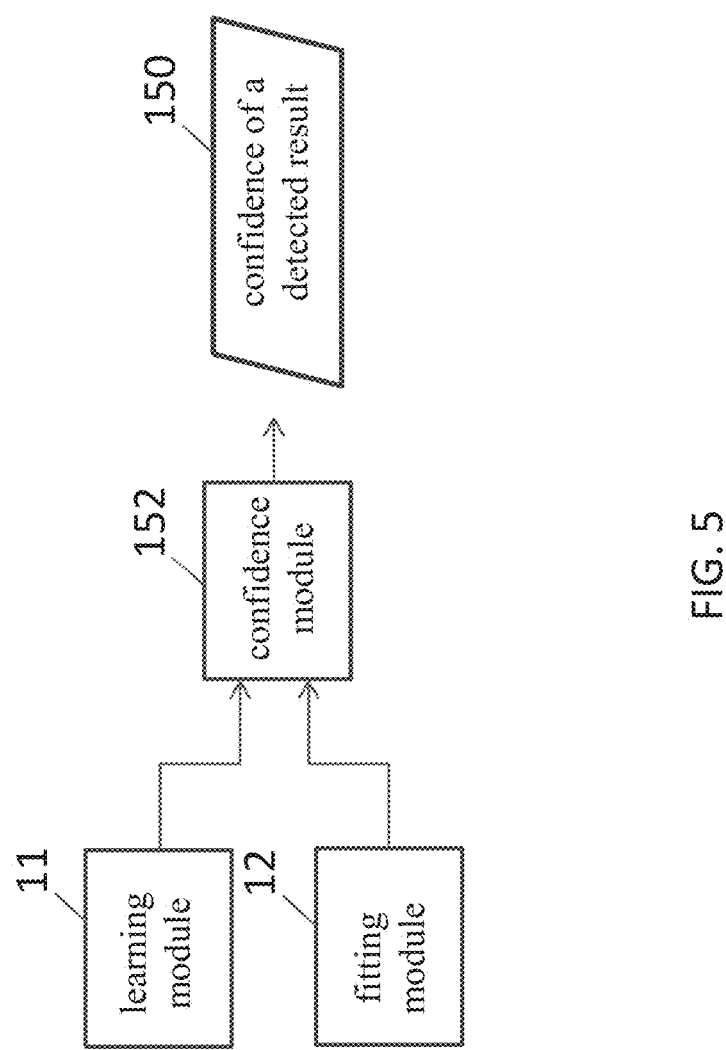
FIG. 5 is a diagram showing function of a confidence module in the system illustrated in FIG. 1, in accordance with some embodiments.

FIG. 5 is a diagram showing function of the confidence module 152 in the system 10 illustrated in FIG. 1, in accordance with some embodiments.

Referring to FIG. 5, the confidence module 152 as a result of the training process of FIG. 4A may be applied to on-line lane detection in the system 10 as illustrated in FIG. 1. In the present embodiment, the confidence module 152 determines confidence of features from at least one of the learning module 11 or the fitting module 12, and generates a confidence 150 of a detected result. In a confidence check, the confidence module 152 determines, based on the parameters for expressing a lane marking in an arc, whether a fitted lane marking from the fitting module 12 is reasonable. In an embodiment, the confidence 150 is provided to the testing module 24 described and illustrated in FIG. 3 to determine whether the confidence module 152 should be refined. For example, if the confidence 150 of a predicted lane marking is relatively strong while the testing shows a significant difference between the labeled data 201 and the predicted lane marking, it may then be determined that refinement of the confidence module 152 or its associated algorithm for confidence evaluation is required. Also for example, on the contrary, if the confidence 150 of a predicted lane marking is relatively weak while the testing shows no significant difference between the labeled data 201 and the predicted lane marking, it may then be determined that refinement of the confidence module 152 or its associated algorithm for confidence evaluation is required.

Figure 6:
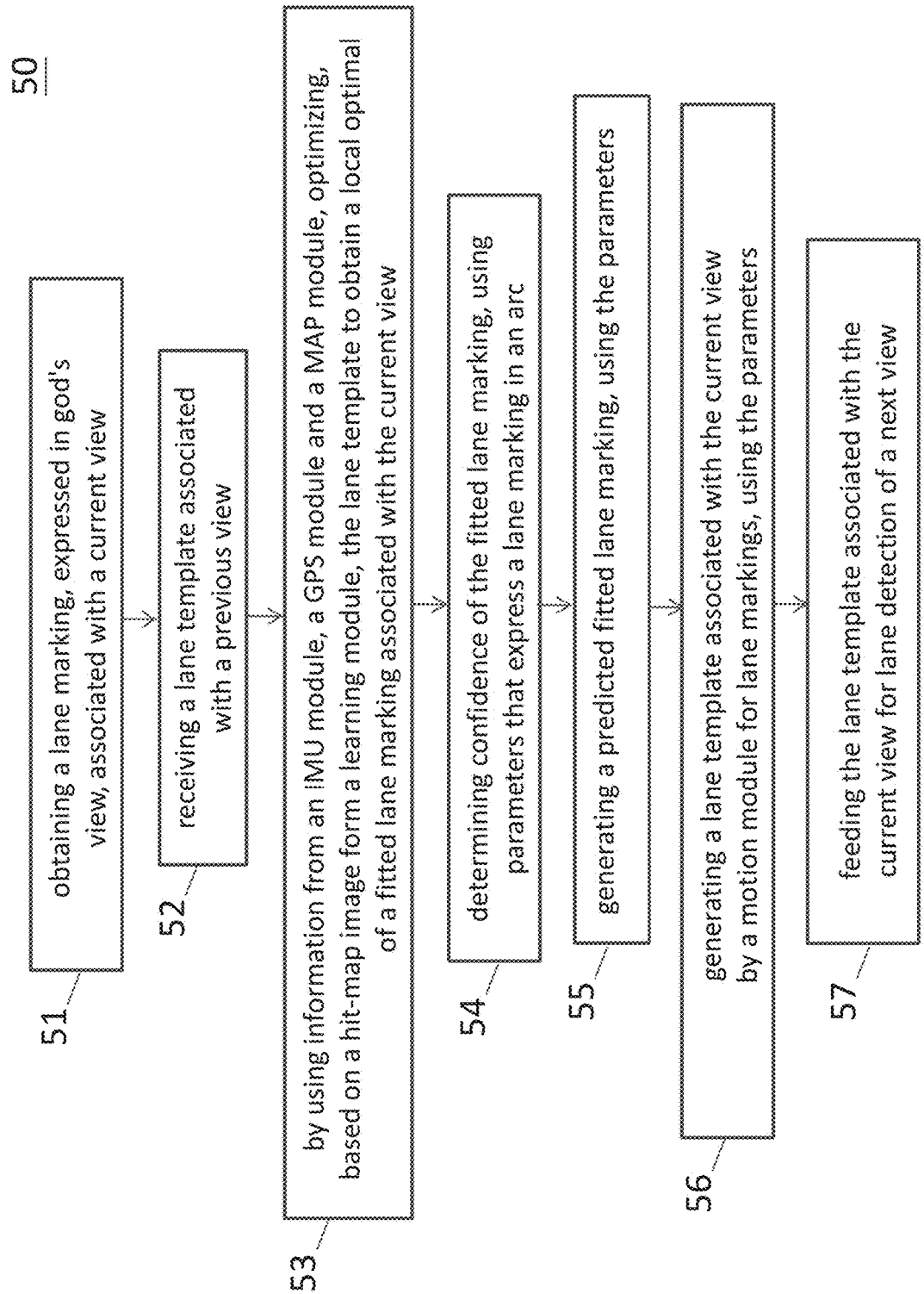
FIG. 6 is a flow diagram showing a method of on-line lane detection, in accordance with an embodiment.

FIG. 6 is a flow diagram showing a method 50 of on-line lane detection, in accordance with an embodiment.

Referring to FIG. 6, in operation 51, a lane marking associated with a current view is obtained. The lane marking is expressed in god's view.

In operation 52, a lane template associated with a previous view is received. Also referring to FIG. 1, the lane template is generated by the motion module 183 for lane markings.

Next, in operation 53, also referring to FIG. 1, by using information from an IMU module, a GPS module and a MAP module, based on a hit-map image 102 form the learning module 11, the lane template is optimized to obtain a local optimal of a fitted lane marking associated with the current view.

In operation 54, confidence of the fitted lane marking is determined, using parameters that express a lane marking in an arc. Also referring to FIG. 1, the confidence module 152 determines the confidence of a fitted lane marking.

In operation 55, a predicted lane marking is generated by, for example, the parameterizing module 18 of FIG. 1, using the parameters.

In operation 56, a lane template associated with the current view is generated by the motion module 183, using the parameters.

Subsequently, in operation 57, the lane template associated with the current view is fed to the fitting module 12 of FIG. 1 for lane detection of a next view.

Figure 7:
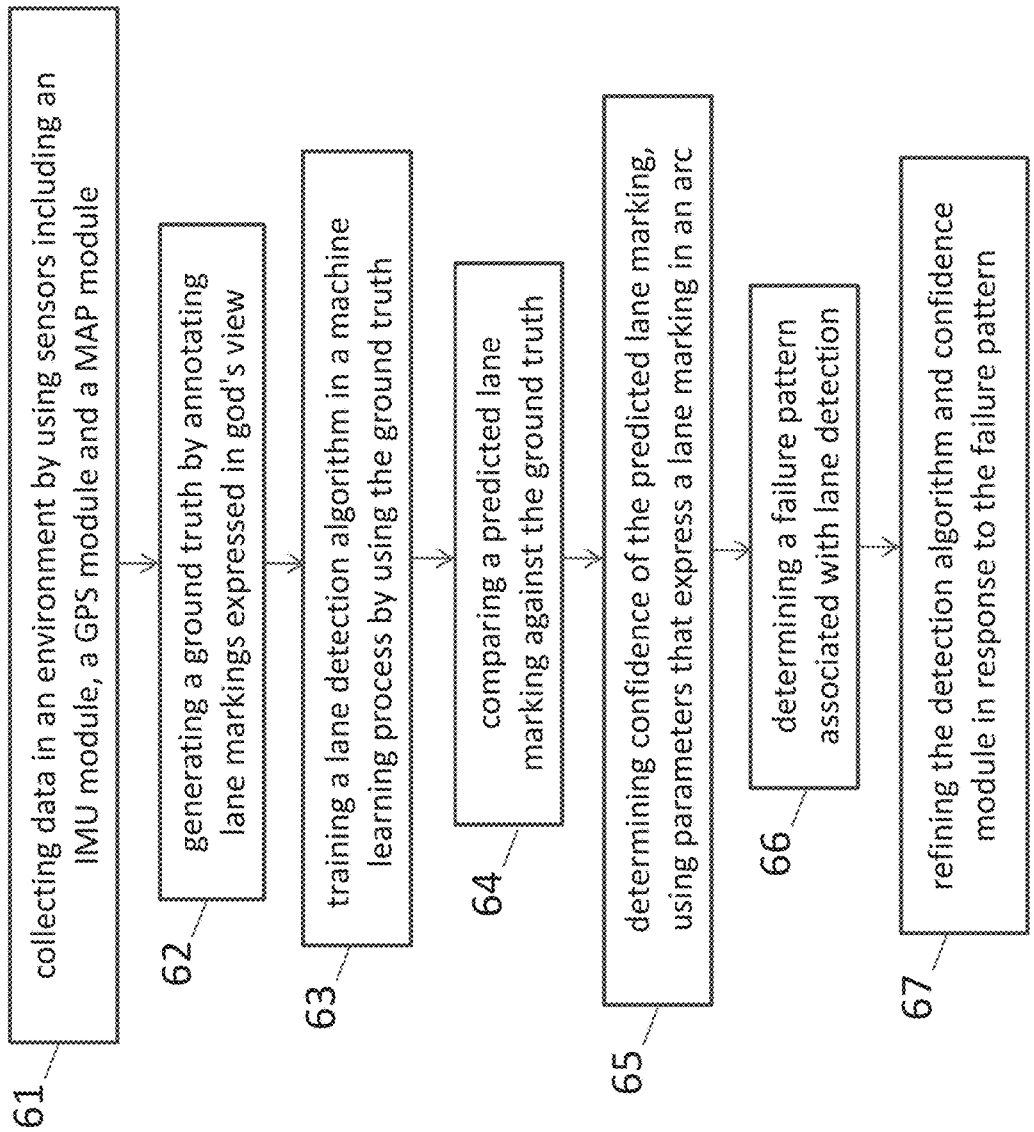
FIG. 7 is a flow diagram showing a method of supporting on-line lane detection, in accordance with an embodiment.

FIG. 7 is a flow diagram showing a method 60 of supporting on-line lane detection, in accordance with an embodiment.

Referring to FIG. 7, in operation 61, data are collected in an environment by using sensors that include an IMU module, a GPS module and a MAP module.

Next, in operation 62, a ground truth is generated. Also referring to FIG. 2, the collected data are annotated with lane markings expressed in god's view so as to generate a labeled data that serves as a ground truth.

In operation 63, a lane detection algorithm is trained in a machine learning process by using the ground truth.

In operation 64, a predicted lane marking generated according to the lane detection algorithm is compared against the ground truth. Then in operation 65, a comparison result determines whether a confidence, determined by a confidence module using parameters that express a lane marking in an arc, of the predicted lane is reasonable.

Subsequently in operation 66, the lane detection algorithm may be refined by, for example, adding additional information on labeled data. Alternatively, in operation 67, the confidence module may be refined by the additional information. In an embodiment, both the lane detection algorithm and the confidence module are refined or optimized.

FIG. 8 is a block diagram of a system 70 for lane detection, in accordance with some embodiments.

Referring to FIG. 8, the system 70 includes a processor 71, a computer server 72, a network interface 73, an input and output (I/O) device 75, a storage device 77, a memory 79, and a bus or network 78. The bus 78 couples the network interface 73, the I/O device 75, the storage device 77 and the memory 79 to the processor 71.

Accordingly, the processor 71 is configured to enable the computer server 72, e.g., Internet server, to perform specific operations disclosed herein. It is to be noted that the operations and techniques described herein may be implemented, at least in part, in hardware, software, firmware, or any combination thereof. For example, various aspects of the described embodiments, e.g., the processor 71, the computer server 72, or the like, may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components.

The term "processing unit" or "processing circuitry" may generally refer to any of the foregoing logic circuitry, alone or in combination with other logic circuitry, or any other equivalent circuitry. A control unit including hardware may also perform one or more of the techniques of the present disclosure.

In some embodiments in accordance with the present disclosure, the computer server 72 is configured to utilize the I/O port 75 communicate with external devices via a network 78, such as a wireless network. In certain embodiments, the I/O port 75 is a network interface component, such as an Ethernet card, an optical transceiver, a radio frequency transceiver, or any other type of device that can send and receive data from the Internet. Examples of network interfaces may include Bluetooth®, 3G and WiFi® radios in mobile computing devices as well as USB. Examples of wireless networks may include WiFi®, Bluetooth®, and 3G. In some embodiments, the internet server 72 is configured to utilize the I/O port 75 to wirelessly communicate with a client device 76, such as a mobile phone, a tablet PC, a portable laptop or any other computing device with internet connectivity. Accordingly, electrical signals are transmitted between the computer server 72 and the client device 76.

In some embodiments in accordance with the present disclosure, the computer server 72 is a virtual server capable of performing any function a regular server has. In certain embodiments, the computer server 72 is another client device of the system 70. In other words, there may not be a centralized host for the system 70, and the client devices 76 in the system are configured to communicate with each other directly. In certain embodiments, such client devices 76 communicate with each other on a peer-to-peer (P2P) basis.

The processor 71 is configured to execute program instructions that include a tool module configured to perform methods as described and illustrated with reference to FIGS. 4B, 6 and 7. Accordingly, in an embodiment in accordance with the method 30 described and illustrated with reference to FIG. 4B, the tool module is configured to execute the operations including: receiving features from at least one of a learning module or a fitting module; training the features in a confidence training module by using labeled data; determining a failure pattern based on the features and the labeled data; and generating a set of parameters for describing confidence of a lane marking.

In another embodiment, in accordance with the method 50 described and illustrated with reference to FIG. 6, the tool module is configured to execute the operations including: obtaining a lane marking, expressed in god's view, associated with a current view; receiving a lane template associated with a previous view; by using information from an IMU module, a GPS module and a MAP module, optimizing, based on a hit-map image form a learning module, the lane template to obtain a local optimal of a fitted lane marking associated with the current view; determining confidence of the fitted lane marking, using parameters that express a lane marking in an arc; generating a predicted fitted lane marking, using the parameters; generating a lane template associated with the current view by a motion module for lane markings, using the parameters; and feeding the lane template associated with the current view for lane detection of a next view.

In yet another embodiment, in accordance with the method 60 described and illustrated with reference to FIG. 7, the tool module is configured to execute the operations including: collecting data in an environment by using sensors including an IMU module, a GPS module and a MAP module; generating a ground truth by annotating lane markings expressed in god's view; training a lane detection algorithm in a machine learning process by using the ground truth; comparing a predicted lane marking against the ground truth; determining confidence of the predicted lane marking, using parameters that express a lane marking in an arc; determining a failure pattern associated with lane detection; and refining the detection algorithm or refining the confidence module or both in response to the failure pattern.

The network interface 73 is configured to access program instructions and data accessed by the program instructions stored remotely through a network (not shown).

The I/O device 75 includes an input device and an output device configured for enabling user interaction with the system 70. In some embodiments, the input device comprises, for example, a keyboard, a mouse, and other devices. Moreover, the output device comprises, for example, a display, a printer, and other devices.

The storage device 77 is configured for storing program instructions and data accessed by the program instructions. In some embodiments, the storage device 77 comprises, for example, a magnetic disk and an optical disk.

The memory 79 is configured to store program instructions to be executed by the processor 71 and data accessed by the program instructions. In some embodiments, the memory 79 comprises a random access memory (RAM) and/or some other volatile storage device and/or read only memory (ROM) and/or some other non-volatile storage device including other programmable read only memory (PROM), erasable programmable read only memory (EPROM), electronically erasable programmable read only memory (EEPROM), flash memory, a hard disk, a solid state drive (SSD), a compact disc ROM (CD-ROM), a floppy disk, a cassette, magnetic media, optical media, or other computer readable media. In certain embodiments, the memory 79 is incorporated into the processor 71.

Thus, specific embodiments and applications have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment.

What is claimed is:

1. A method of lane detection, comprising:
   receiving images of a road comprising images of at least one lane marking;
   receiving a hit-map image associated with a current view of the road, wherein the hit-map image identifies pixels in the hit-map image that hit the at least one lane marking;
   receiving a first lane template associated with a previous view of the road previous to the current view of the road;
   generating a fitted lane marking using the first lane template and the hit-map image; and
   determine a confidence level of the fitted lane marking using parameters of an arc of a circle fitted into the fitted lane marking.

2. The method according to claim 1, further comprising:
   generating a ground truth by annotating the received images to identify the at least one lane marking.

3. The method according to claim 2, wherein the generating the ground truth comprises:
   generating labeled lane markings by annotating the at least one lane marking using arcs of circles.

4. The method according to claim 2, wherein the ground truth is used to train a lane detection algorithm, the method further comprising:
   training the lane detection algorithm relating the images to the hit-map images using the ground truth; and
   generating another hit-map image for the current view of the road based on the lane detection algorithm.

5. The method according to claim 1, wherein the generating the fitted lane marking comprises:
   adjusting the first lane template associated with the previous view of the road.

6. The method according to claim 1, further comprising:
   determining that the confidence level of the fitted lane marking is above or equal to a threshold confidence value; and
   outputting the fitted lane marking as a predicted lane marking.

7. The method according to claim 6, further comprising:
   generating a ground truth by annotating the received images to identify the at least one lane marking;
   comparing the fitted lane marking having the confidence level above or equal to the threshold confidence value to the ground truth; and
   determining a failure pattern associated with the fitted lane marking when the comparing indicates that the fitted lane marking fails to match the ground truth.

8. The method according to claim 1, further comprising:
   determining that the confidence level of the fitted lane marking is below a threshold confidence value; and
   rejecting the fitted lane marking due to the determining that the confidence level of the fitted lane marking is below the threshold confidence value.

9. The method according to claim 8, further comprising:
   generating a ground truth by annotating the received images to identify the at least one lane marking;
   comparing the fitted lane marking having the confidence level below the threshold confidence value to the ground truth; and
   determining a failure pattern associated with the fitted lane marking when the comparing indicates that the fitted lane marking matches the ground truth.

10. The method according to claim 1, further comprising:
    generating a ground truth by annotating the received images to identify the at least one lane marking; and
    training a confidence module based on the ground truth and at least one of the hit-map image or the fitted lane marking.

11. The method according to claim 10, further comprising:
    refining the confidence module by adding labeled data in training the confidence module.

12. A system for lane detection, the system comprising:
    a memory;
    one or more processing units; and
    one or more programs stored in the memory and configured for execution by the one or more processing units, the one or more programs comprising instructions to cause at least:
    receiving images of a road comprising at least one lane marking;

receiving a hit-map image associated with a current view of the road, wherein the hit-map image identifies pixels in the hit-map image that hit the at least one lane marking;

receiving a first lane template associated with a previous view of the road previous to the current view of the road;

generating a fitted lane marking using the first lane template and the hit-map image; and determining a confidence level of the fitted lane marking using parameters of an arc of a circle fitted into the fitted lane marking.

13. The system according to claim 12, wherein the one or more programs comprises instructions to further cause at least:

generating a second lane template associated with the current view of the road using the parameters; and using the second lane template for processing of a next view of the road subsequent to the current view of the road.

14. The system according to claim 12, wherein the fitted lane marking is represented in a coordinate system in which a vehicle is taken as an origin, a direction from a back of the vehicle to a front of the vehicle is a y-coordinate axis, and a direction from one side of the vehicle to another side of the vehicle is a x-coordinate axis, and wherein the x-coordinate axis is perpendicular to the y-coordinate axis.

15. The system according to claim 12, wherein the generating the fitted lane marking comprises:

adjusting the first lane template associated with the previous view of the road according to at least one of information of a global positioning system (GPS), an inertial measurement unit (IMU), and a mapping.

16. The system according to claim 12, wherein the at least one lane marking has a plurality of lane markings, wherein the generating the fitted lane marking further comprises using at least one of the following constraints:

the lane markings are parallel to each other;

a shape of curvatures of lanes is a circle;

a curvature of lanes is smaller than approximately three hundred meters;

a lane spacing between neighboring lanes ranges between approximately three and four meters; and a color at an edge of a lane marking is different from that at other portions of the road free from the lane marking.

17. The system according to claim 12, wherein the one or more programs comprises instructions to further cause at least:

generating a ground truth by annotating the received images to identify the at least one lane marking;

performing comparison of the fitted lane marking to the ground truth; and determining a failure pattern associated with the fitted lane marking when the comparison indicates that the fitted lane marking fails to match the ground truth.

18. A method of lane detection for a non-transitory computer readable storage medium storing one or more programs, the one or more programs comprising instructions, which when executed by a computing device, cause the computing device to perform the following steps comprising:

receiving images of a road comprising at least one lane marking;

receiving a hit-map image associated with a current view of the road, wherein the hit-map image identifies pixels in the hit-map image that hit the at least one lane marking;

receiving a first lane template associated with a previous view of the road previous to the current view of the road;

generating a fitted lane marking using the first lane template and the hit-map image; and determine a confidence level of the fitted lane marking using parameters of an arc of a circle fitted into the fitted lane marking.

19. The method according to claim 18, comprising:

training a confidence module based on the ground truth and at least one of the hit-map image or the fitted lane marking, wherein the ground truth is associated with the at least one lane marking; and refining the confidence module by adding labeled data in training the confidence module.

20. The method according to claim 19, wherein the confidence module is trained via machine learning.

* * * * *